United States Patent [19]
Chen

[11] Patent Number: 6,112,620
[45] Date of Patent: Sep. 5, 2000

[54] BICYCLE PEDAL ASSEMBLY

[76] Inventor: Chung-I Chen, No. 3, Kung-Chi Rd., Yu-Shih-Kung-Yeh Dist., Ta-Chia Chen, Taichung Hsien, Taiwan

[21] Appl. No.: 09/187,937

[22] Filed: Nov. 6, 1998

[51] Int. Cl.[7] .................................................. G05G 1/14
[52] U.S. Cl. .......................................... 74/594.6; 74/594.4
[58] Field of Search ............................... 74/594.6, 594.4; 36/131

[56] References Cited

U.S. PATENT DOCUMENTS

| | | | |
|---|---|---|---|
| 5,003,841 | 4/1991 | Nagano | 74/594.4 |
| 5,203,229 | 4/1993 | Chen | 74/594.4 |
| 5,685,202 | 11/1997 | Chen | 74/594.6 |
| 5,755,144 | 5/1998 | Ueda | 74/594.6 |
| 5,787,764 | 8/1998 | Peyre | 74/594.4 |

*Primary Examiner*—David A. Bucci
*Assistant Examiner*—Chong H. Kim
*Attorney, Agent, or Firm*—Fish & Richardson P.C.

[57] ABSTRACT

A bicycle pedal assembly includes a one-piece pedal body having a tubular portion adapted to be mounted rotatably on a pedal shaft around a first axis, front and rear end walls in a longitudinal direction parallel to the first axis, and right and left pairs of front and rear lateral walls that extend respectively from the front and rear end walls rightward and leftward in a first transverse direction relative to the longitudinal direction to form rightmost and leftmost pairs of front and rear end portions, respectively. Two forward anchor members are respectively mounted between the rightmost front and rear end portions in the longitudinal direction and proximate to an upper surfaces of the lateral walls, and between the leftmost front and rear end portions in the longitudinal direction and proximate to lower surfaces thereof, such that the forward anchor members are in symmetry relative to the first axis. Two rearward anchor members are respectively mounted between the leftmost front and rear end portions in the longitudinal direction and proximate to the upper surfaces thereof, and between the rightmost front and rear end portions in the longitudinal direction and proximate to the lower surfaces thereof, such that the rearward anchor members are in symmetry relative to the first axis.

5 Claims, 6 Drawing Sheets

BICYCLE PEDAL ASSEMBLY

BACKGROUND OF THE INVENTION

1. Field of the Invention

The invention relates to a pedal assembly, more particularly to a bicycle pedal assembly.

2. Description of the Related Art

A conventional bicycle pedal assembly is adapted to be mounted on a bicycle pedal shaft for engaging a cleat unit which has forward and rearward ends and which is fixed to a bottom surface of a sole of a cyclist's shoe.

Referring to FIGS. 1 and 2, the conventional bicycle pedal assembly 10 is shown to include a rectangular pedal body 11 having front and rear portions 11F, 11R, and a tubular portion 13 so as to extend from a central portion thereof and adapted to be mounted on the bicycle pedal shaft (not shown) around a first axis and extends in a longitudinal direction parallel to the first axis in order to define front and rear accommodating spaces 12 at front and rear sides of the tubular portion 13. The pedal body 11 has upper and lower surfaces 11U, 11L opposite to each other in a transverse direction relative to the longitudinal direction. Two forward anchor members 26, in the form of elongate plates, are mounted transversely on the upper and lower surfaces of the tubular portion 13 in such a manner that the forward anchor members 26 are in symmetry relative to the first axis. Two rearward anchor members 22 are mounted in the front and rear accommodating spaces 12 respectively by means of two axles 23 that extend in the longitudinal direction in such a manner that the rearward anchor members 22 are in symmetry relative to the first axis. Each of the rearward anchor members 22 has a grip portion 22G disposed to be brought toward a respective one of the forward anchor members 26 and adapted to clamp the cleat unit 31 (see FIG. 3) in a transverse direction relative to the longitudinal direction in cooperation with the respective forward anchor member 26. Two units of biasing members 21 are sleeved around the axles 23 to bias the rearward anchor members 22 respectively so as to urge the grip portions 22G to move toward the forward anchor members 26.

A disadvantage of the conventional pedal assembly resides in that the forward anchor members 26 are in the form of elongate plates, and have lateral arms 261 that extend in the longitudinal direction and that cover the front and rear accommodating spaces 12 such that once the cleat unit 31 is engaged by the front and rear anchor members 26, 22, dirt that attaches thereto cannot be dropped through the front and rear accommodating spaces 12.

SUMMARY OF THE INVENTION

Therefore, the object of this invention is to provide a bicycle pedal assembly that is adapted to be mounted on a bicycle shaft and that can overcome the aforementioned disadvantage that is associated with the conventional bicycle pedal assembly.

Accordingly, a bicycle pedal assembly of this invention is adapted to be mounted on a bicycle pedal shaft for engaging a cleat unit. The bicycle pedal assembly includes a one-piece pedal body, two forward anchor members, two rearward anchor members, and a pair of biasing members. The pedal body includes a tubular portion adapted to be mounted rotatably on the bicycle pedal shaft around a first axis, and having front and rear end walls in a longitudinal direction parallel to the first axis, and right and left pairs of front and rear lateral walls that extend respectively from the front and rear end walls rightward and leftward in a first transverse direction relative to the longitudinal direction to form rightmost and leftmost pairs of front and rear end portions, respectively. Each of the lateral walls has upper and lower surfaces opposite to each other in a transverse direction relative to both the first transverse and longitudinal directions. The forward anchor members are respectively mounted between the rightmost front and rear end portions in the longitudinal direction and proximate to the upper surfaces thereof, and between the leftmost front and rear end portions in the longitudinal direction and proximate to the lower surfaces thereof, such that the forward anchor members are in symmetry relative to the first axis. The rearward anchor members are respectively mounted between the leftmost front and rear end portions in the longitudinal direction and proximate to the upper surfaces thereof, and between the rightmost front and rear end portions in the longitudinal direction and proximate to the lower surfaces thereof, such that the rearward anchor members are in symmetry relative to the first axis. Each of the rearward anchor members includes a grip portion disposed to be brought toward a respective one of the forward anchor members and adapted to clamp the cleat unit in the first transverse direction in cooperation with the respective one of the forward anchor members. The biasing members are respectively disposed to bias the rearward anchor members so as to urge the grip portions thereof to move toward the forward anchor members, respectively.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 7:
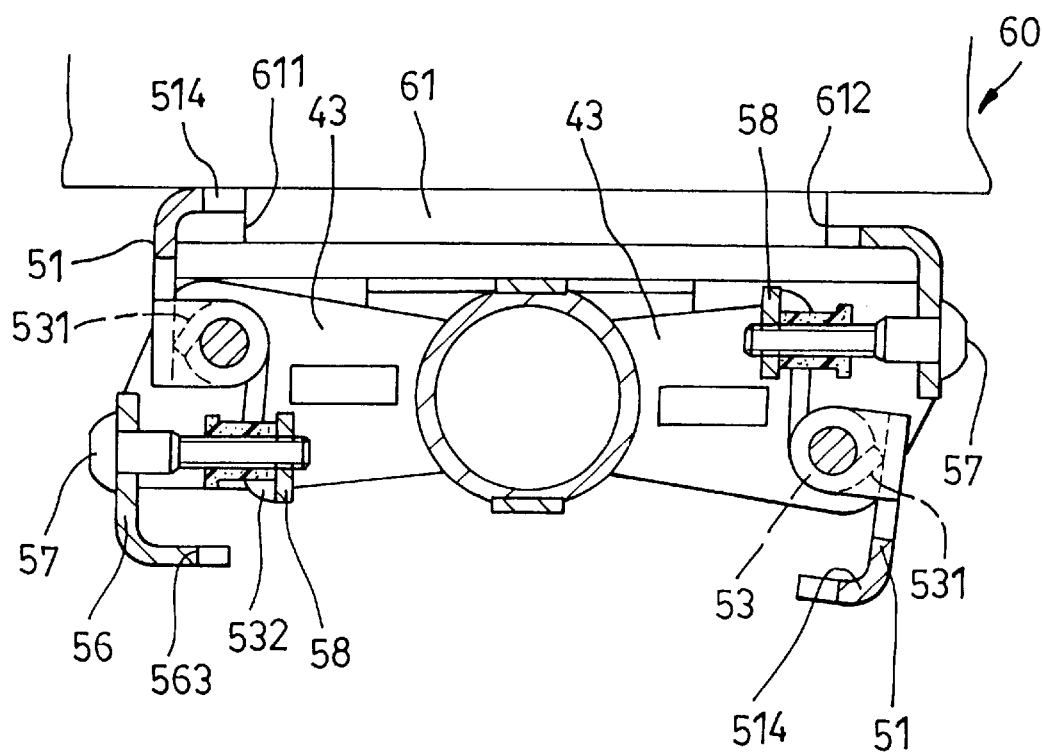
FIG. 7 illustrates how the preferred embodiment engages a cleat unit that is fixed to the sole of a cyclist's shoe.

The preferred embodiment of a bicycle pedal assembly according to this inventions is adapted to be mounted on a bicycle pedal shaft and is adapted to engage a cleat unit 61 which has forward and rearward ends 612, 611 and which is fixed to a bottom surface of a sole of a cyclist's shoe 60, as best shown in FIG. 7.

Figure 1:
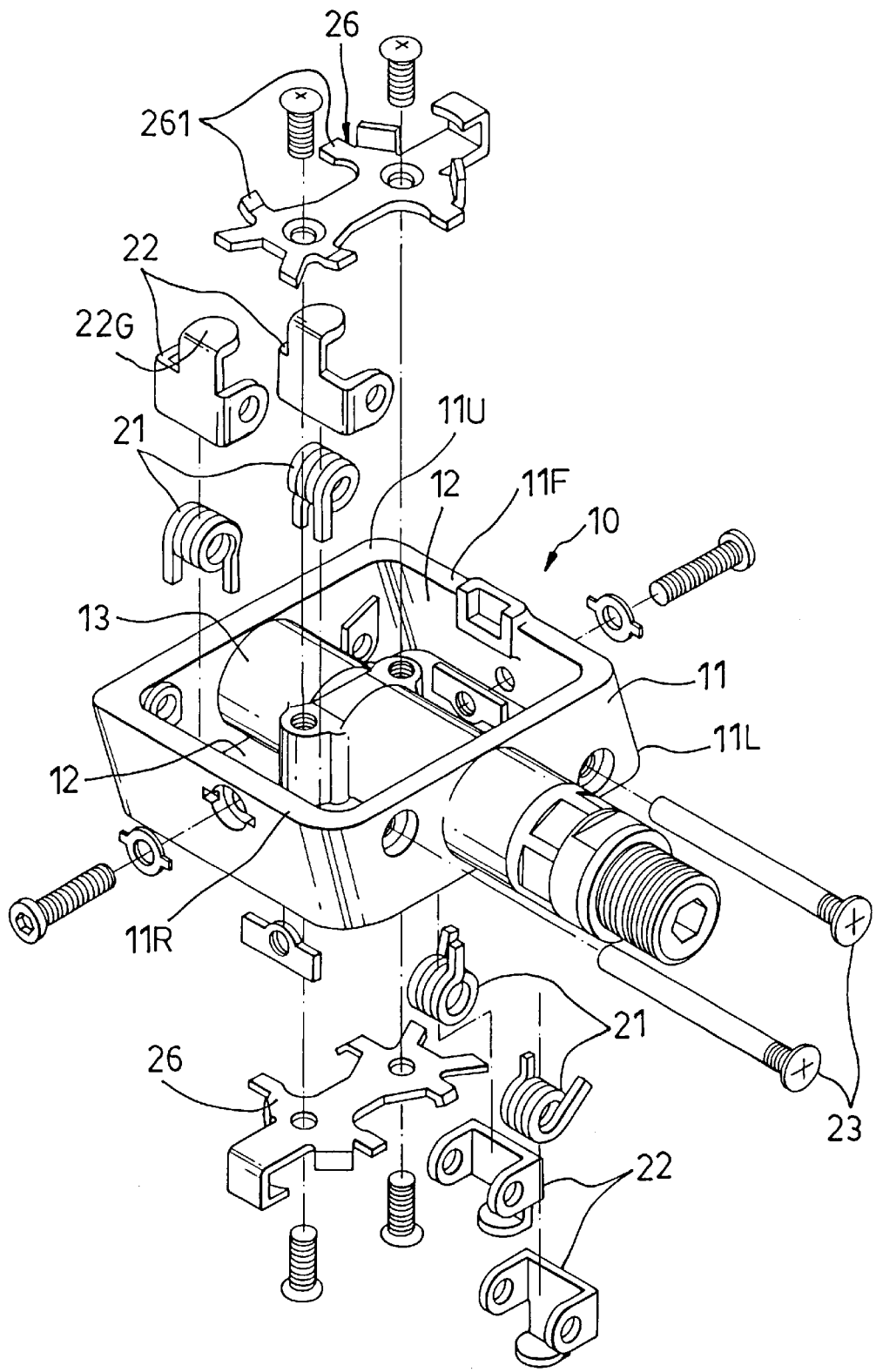
FIG. 1 is an exploded view of a conventional bicycle pedal assembly.
Figure 2:
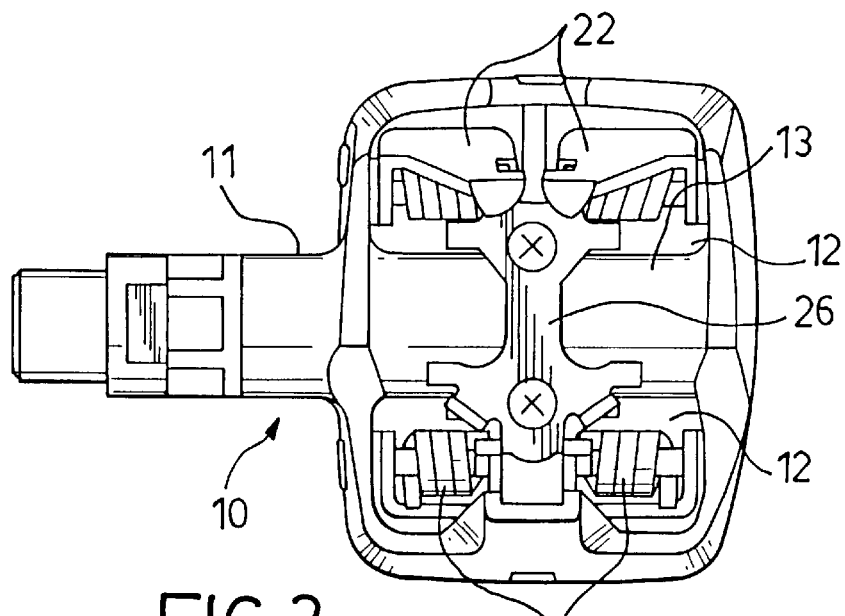
FIG. 2 is a top view of the conventional bicycle pedal assembly.
Figure 3:
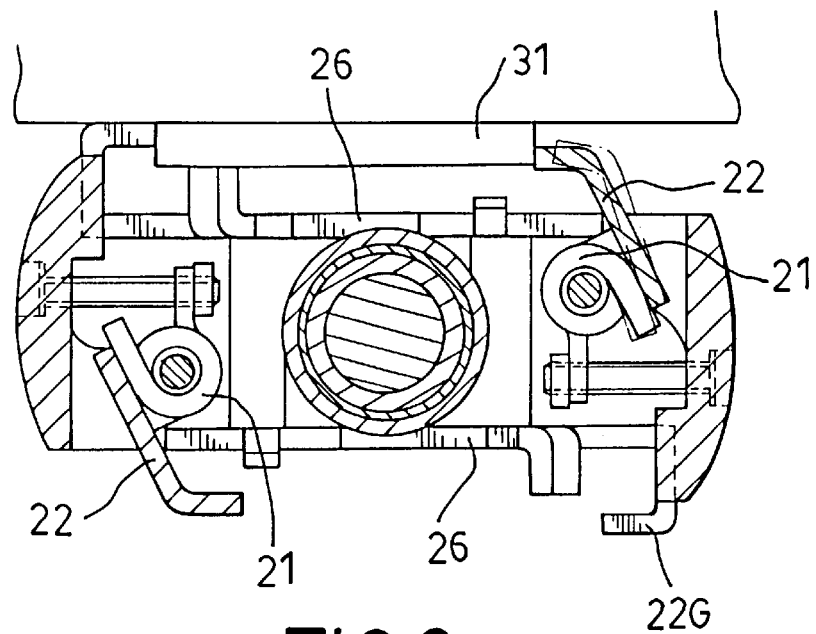
FIG. 3 illustrates how the conventional bicycle pedal assembly engages a cleat unit that is fixed to a sole of a cyclist's shoe.
Figure 4:
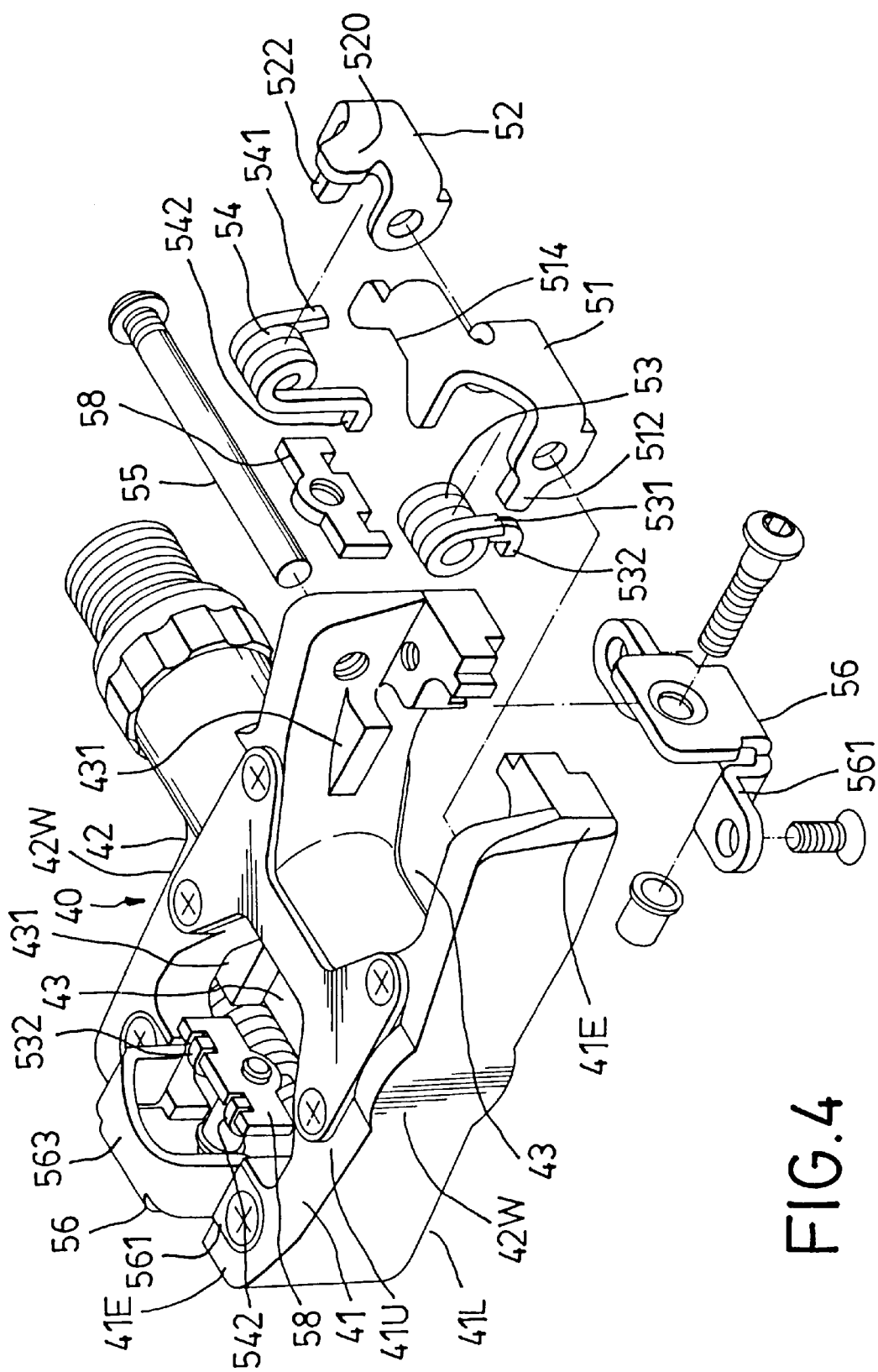
FIG. 4 is an exploded view of a preferred embodiment of a bicycle pedal assembly according to this invention.
Figure 5:
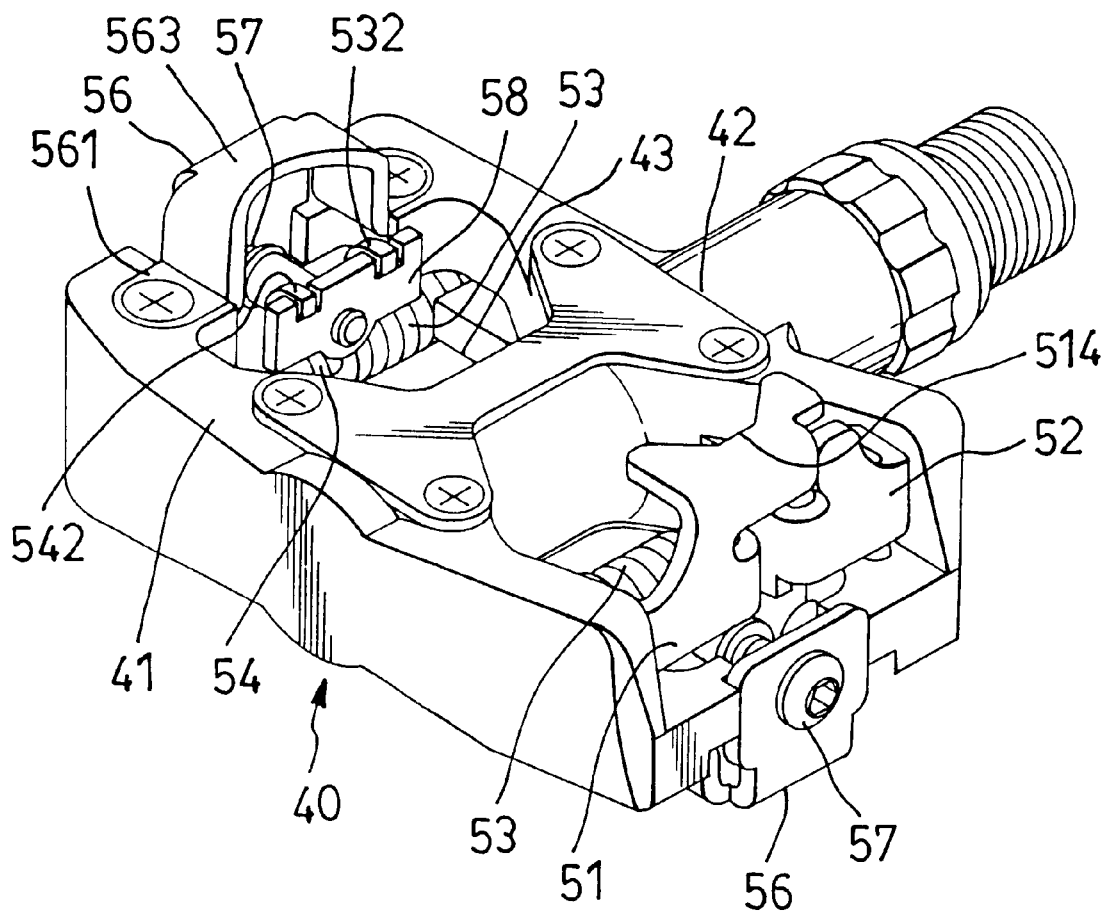
FIG. 5 is a perspective view of the preferred embodiment.
Figure 6:
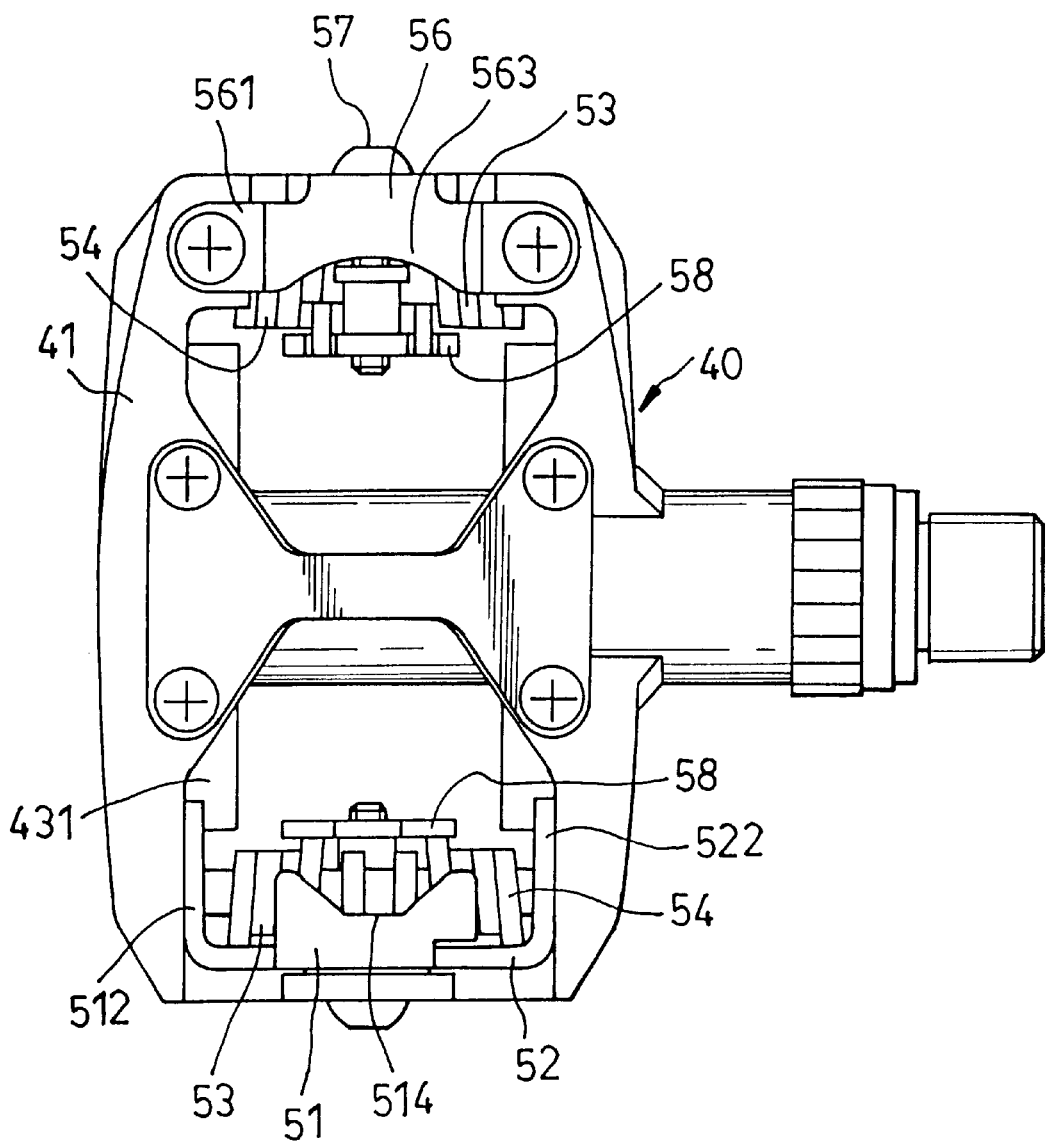
FIG. 6 is a top plan view of the preferred embodiment.

Referring to FIGS. 4, 5 and 6, the bicycle pedal assembly of the preferred embodiment includes a one-piece pedal body 40, two forward anchor members 56, two rearward anchor members 51, and a pair of biasing members 53.

As illustrated, the pedal body 40 includes a tubular portion 42 adapted to be mounted rotatably on the bicycle pedal shaft (not shown) around a first axis so as to extend in a longitudinal direction parallel to the first axis. The pedal body 40 further has front and rear end walls 42W, and right and left pairs of front and rear lateral walls 41 that extend respectively from the front and rear end walls 42W rightward and leftward in a first transverse direction relative to the longitudinal direction to form rightmost and leftmost pairs of front and rear end portions 41E, respectively. Each of the lateral walls 41 has upper and lower surfaces 41U, 41L opposite to each other in a transverse direction relative to both the first transverse and longitudinal directions.

The forward anchor members 56 are mounted respectively between the rightmost front and rear end portions 41E in the longitudinal direction, and proximate to the upper surfaces 41U thereof, and between the leftmost front and rear end portions 41E in the longitudinal direction and proximate to the lower surfaces 41L thereof, such that the forward anchor members 56 are in symmetry relative to the first axis.

The rearward anchor members 51 are mounted respectively between the leftmost front and rear end portions 41E in the longitudinal direction and proximate to the upper surfaces 41U thereof, and between the rightmost front and rear end portions 41E in the longitudinal direction and proximate to the lower surfaces 41L thereof, such that the rearward anchor members 51 are in symmetry relative to the first axis. Each of the rearward anchor members 51 includes a grip portion 514 disposed to be brought toward a respective one of the forward anchor members 56 and adapted to clamp the cleat unit 61 (see FIG. 7) in the first transverse direction and in cooperation with the respective one of the forward anchor members 56.

The biasing members 53, 54 are disposed respectively to bias the rearward anchor members 51 so as to urge the grip portions 514 thereof to move toward the forward anchor members 56, respectively.

In the preferred embodiment, each of the forward anchor members 56 has two lug portions 561 that extend in the longitudinal direction and that are mounted securely onto the upper or lower surfaces 41U, 41L of a respective one of the rightmost and leftmost pairs of front and rear end portions 41E, and an intermediate portion 563 that is interposed between the lug portions 561 and that projects uprightly from the lug portions 561 to an elevation beyond the upper or lower surfaces 41U, 41S so as to confine an accommodating space adapted to be inserted and anchored therein by the forward end 612 of the cleat unit 61. Each of the rearward anchor members 51 includes an axle 55 mounted between respective ones of the leftmost and rightmost front and rear end portions 41E in the longitudinal direction for mounting the grip portion 514 to be pivotally thereon. Each of the biasing members 53 includes a coil spring sleeved around a respective one of the axles 55 and spaced from the tubular portion 42 in the first transverse direction. Each of the coil springs has a first end 531 urging the grip portion 514 to pivot around said axle 55 so as to move toward the respective forward anchor member 56, and a second end 532 stationarily rested relative to the axle 55.

The preferred embodiment further includes a biasing force adjusting member 58, in the form of an elongate plate, disposed to be adjustably screwed on each of the forward anchor member 56 in the first transverse direction to abut against the second end 532 of a respective coil spring so as to be rested upon by the second end 532 of the respective coil spring. A restriction member 52 is sleeved around each axle 55 and is disposed side by side relative to a respective rear anchor member 51. The restriction member 52 has an abutment portion 520 extending in the longitudinal direction and located at a distal side of the grip portion 514 relative to the tubular portion 42 to limit the extent of pivoting movement of the grip portion which is caused by downward pressing of the rearward end of the cleat unit against the biasing action of a respective coil spring. An extra coil spring 54 is sleeved around each axle 55, and has an end portion 541 arrested by a corresponding biasing force adjusting member 58 and the other end portion 542 that urges the abutment portion 520 of a corresponding restriction member 52.

Note that each of the right and left pairs of the front and rear lateral walls 42W is provided with a pair of retention studs 431 that extend from inner surfaces thereof for retention of the positioning tongues 512, 522 of the rear anchor members 51 and the restriction members 52. A hollow space 43 is defined between the forward or rearward anchor member 56, 51 and the tubular portion 42 in the transverse direction relative to the longitudinal direction such that dirt attached to the cleat unit 61 can be dropped through the hollow space 43 when the cleat unit 61 is anchored between the forward and rearward anchor members 56, 51. The object of the invention is accordingly achieved.

With this invention thus explained, it is apparent that numerous modifications and variations can be made without departing from the scope and spirit of this invention. It is therefore intended that this invention be limited only as indicated in the appended claims.

I claim:

1. A bicycle pedal assembly adapted to be mounted on a bicycle pedal shaft and adapted to engage a cleat unit which has forward and rearward end and which is fixed to a bottom surface of a sole of a cyclist's show, the bicycle pedal assembly comprising:

a one-piece pedal body including a tubular portion adapted to be mounted rotatably on the bicycle pedal shaft around a first axis, and having front and rear end walls in a longitudinal direction parallel to said first axis;

right and left pairs of front and rear lateral walls extending respectively from said front and rear end walls rightward and leftward in a first transverse direction relative to said longitudinal direction to form rightmost and leftmost pairs of front and rear end portions, respectively, each of said lateral walls having upper and lower surfaces opposite to each other in a transverse direction relative to both said first transverse and longitudinal directions;

two forward anchor members respectively mounted between said rightmost front and rear end portions in said longitudinal direction and proximate to said upper surfaces thereof, and between said leftmost front and rear end portions in said longitudinal direction and proximate to said lower surfaces thereof, such that said forward anchor members are in symmetry relative to said first axis;

two rearward anchor members respectively mounted between said leftmost front and rear end portions in said longitudinal direction and proximate to said upper surfaces thereof, and between said rightmost front and rear end portions in said longitudinal direction and proximate to said lower surfaces thereof, such that said rearward anchor members are in symmetry relative to said first axis, each of said rearward anchor members including a grip portion disposed to be brought toward a respective one of said forward anchor members and adapted to clamp the cleat unit in said first transverse direction in cooperation with the respective one of said forward anchor members; and a pair of biasing members respectively disposed to bias said rearward anchor members so as to urge said grip portions thereof to move toward said forward anchor members, respectively, wherein said forward anchor members respectively having two lug portions extending n said longitudinal direction and mounted securely onto one of said upper and lower surfaces of a respective one of said rightmost and leftmost pairs of said front and rear end portions, and an intermediate portion interposed there between and projecting uprightly therefrom to an elevation beyond said one of said upper and lower surfaces so as to confine an accommodating space adapted to be inserted and anchored therein by the forward end of the cleat unit.

2. The pedal assembly as defined in claim 1, wherein each of said rearward anchor members includes an axle mounted between respective ones of said leftmost and rightmost front and rear end portions in said longitudinal direction for mounting said grip portion pivotally thereon, each of said biasing members including a coil spring sleeved around said axle and spaced from said tubular potion in said first transverse directions, each of said coil springs having a first end urging said grip portion to pivot around said axle so as to move toward a respective one of said forward anchor members, and a second end stationarily rested relative to said axle, and further comprising a biasing force adjusting member disposed to be adjustably screwed on each of said forward anchor members in said first transverse direction to abut against said second end the respective of said coil spring so as to be rested upon by said second end of a respective of said coil spring and a restriction member sleeved around each said axle and disposed side by side relative to a respective said rear anchor member, said restriction member having an abutment portion extending in said longitudinal direction and located at a distal side of said grip portion relative to said tubular portion to limit extent of pivoting movement of said grip portion which is caused by downward pressing of rearward end of the cleat unit against biasing action of a respective said coil spring.

3. The pedal assembly as defined in claim 2, further comprising an extra coil spring sleeved around each said axle, and having an end portion arrested by a corresponding said biasing force adjusting member and an opposite end portion urging said abutment portion of a corresponding said restriction member.

4. The pedal assembly as defined in claim 1, wherein each of said rearward anchor members includes an axle mounted between respective ones of said leftmost and rightmost front and rear end portions in said longitudinal direction for mounting said grip portion pivotally thereon, each of said biasing members including a coil spring sleeved around said axle and spaced from said tubular potion in said first transverse directions, each of said coil springs having a first end urging said grip portion to pivot around said axle so as to move toward a respective one of said forward anchor members, and a second end stationarily rested relative to said axle, and further comprising a restriction member sleeved around each said axle and disposed side by side relative to a respective said rear anchor member, said restriction member having an abutment portion extending in said longitudinal direction and located at a distal side of said grip portion relative to said tubular portion to limit extent of pivoting movement of said grip portion which is caused by downward pressing of rearward end of the cleat unit against biasing action of a respective said coil spring.

5. The pedal assembly as defined in claim 4, further comprising an extra coil spring sleeved around each said axle, and having an end portion arrested by a corresponding said biasing force adjusting member and an opposite end portion urging said abutment portion of a corresponding said restriction member.

* * * * *